United States Patent
McGee

(10) Patent No.: US 6,393,468 B1
(45) Date of Patent: May 21, 2002

(54) DATA ACCESS CONTROL

(75) Inventor: Niall G McGee, Belfast (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 09/043,146

(22) PCT Filed: Jan. 9, 1998

(86) PCT No.: PCT/GB98/00053

§ 371 Date: Mar. 13, 1998

§ 102(e) Date: Mar. 13, 1998

(87) PCT Pub. No.: WO98/32066

PCT Pub. Date: Jul. 23, 1998

(30) Foreign Application Priority Data

Jan. 20, 1997 (EP) .............................................. 97300331

(51) Int. Cl.$^7$ .......................... G06F 15/16; G06F 17/00
(52) U.S. Cl. ....................................... 709/218; 707/513
(58) Field of Search ................................ 709/201, 203, 709/205, 217, 218, 315, 316; 707/501.1, 513

(56) References Cited

U.S. PATENT DOCUMENTS

| | | | |
|---|---|---|---|
| 5,528,759 A | | 6/1996 | Moore |
| 5,870,550 A | * | 2/1999 | Wesinger, Jr. et al. ...... 709/218 |
| 5,862,325 A | * | 3/1999 | Reed et al. .................. 709/201 |
| 5,889,942 A | * | 3/1999 | Orenshteyn ................. 713/201 |
| 5,941,947 A | * | 8/1999 | Brown et al. ............... 709/225 |

OTHER PUBLICATIONS

Lui, Cricket et al. "Managing Internet Information Services", ISBN: 1–56592–062–7, Preface and TOC, pp. 1–13, Dec. 1994.*

Schulzrinne, "World Wide Web: Whence, Whither, What Next?", IEEE Network:The Magazine of Computer Communications, vol. 10, No. 2, Mar. 1, 1996, pp. 10–17, XP000580078.

Voelker et al, "Mobisaic: An Information System for a Mobile Wireless Computing Environment", Proceedings, Workshop on Mobile Computing Systems and Applications (Cat. No. 94$^{th}$06734), Santa Cruz, CA, Dec. 8–9, 1994, ISBN 0–8186–6345–6, 1995, Los Alamitos, CA, USA, IEEE Comput. Soc. Press, USA, pp. 185–190.

Lewontin, "The DCE Web Toolkit: Enhancing WWW Protocols with Lower–Layer Services", Computer Networks and ISDN Systems, vol. 27, No. 6, Apr. 1, 1995, pp. 765–771, XP000498084.

Chu et al, "Creating A Hypertext Markup Language Document for An Information Server", Behavior Rresearch Methods and Instrumentation, vol. 27, No. 2, Jan. 1, 1995, pp. 200–205, XP000567305.

Domel, "Mobile Telescript Agents and The Web", Digest Papers of Compcon (Computer Society Conference) 1996, Technologies for the Information Superhighway Santa Clara, Feb. 25–28, 1996, No. Conf. 41, Feb. 25, 1996, Institute of Electrical and Electronics Engineers, pp. 52–57.

* cited by examiner

Primary Examiner—Mark H. Rinehart
Assistant Examiner—Jason P. Cardone
(74) Attorney, Agent, or Firm—Nixon & Vanderhye P.C.

(57) ABSTRACT

A modified Web server comprises a session manager which intercepts all incoming requests from clients for Web pages. Each request incorporates a token which the session manager compares with tokens which are stored in a session store. On finding a matching token, a URL associated with the matching token is used by the Web server to return a Web page indicated by the URL to the requester.

Any URLs embedded in the Web page to be returned are tokenised by the session manager before the page is returned, and the resulting token/URL pair is stored in the session store.

18 Claims, 6 Drawing Sheets

DATA ACCESS CONTROL

This application is a 371 of PCT/GB98/00053, filed Jan. 9, 1998.

BACKGROUND OF THE INVENTION

The present invention relates to information servers and particularly, but not exclusively, to Internet servers and methods of controlling an Internet server.

An important factor which has led to a rapid growth in people and businesses connecting to the Internet is the wealth of information it contains and makes available to practically anyone who has a telephone connection and a personal computer. This strength, however, leads to problems when an information or service provider, which uses the Internet as its communications medium, wishes to control how its information can be accessed.

The information accessible from the Internet is stored on servers which form part of the Internet infrastructure. The information is accessed by clients (which are controlled by users or customers) which are typically connected to, but which are not part of, the Internet. Normally, the clients only connect to the Internet for a relatively short time using, for example, a dial-up modem connection across a telephone line.

While communications and information transfer between Internet clients and servers relies on the well-established TCP/IP protocols, higher-level, dedicated protocols are employed to access certain types of information specific to one of the many services available on the Internet. Different services support different formats of information and allow different types of operation on the information. For example, a Gopher client allows retrieval and display of predominantly text-based information, an FTP (File Transfer Protocol) client supports the transfer between a server and a client of binary or ASCII files and a World Wide Web (or simply a Web) client can retrieve and display mixed text and graphical information, as well as sounds, movies (usually encoded via MPEG), virtual 'worlds', and any other data type for which an appropriate 'viewer' ('helper') application or 'plug-in' is available.

The following description concentrates on the Internet Web service for the purpose of explanation only. The concepts described, however, are more broadly applicable to other Internet services and to other information services available from different communications networks.

FIG. 1 illustrates an example of an Internet connection serving a plurality of clients 100 connected via a local area network 110 to a workstation 120. The workstation 120 is connected via a router 130 and a modem (or ISDN interface) 140 to an Internet connection provider 150. A connection originates from a Web client, for example a Web browser, which is a software process typically residing on a personal computer (PC) or workstation. Using the connection, for example, client 100a can retrieve public information from any Internet server.

In the following description the term Internet server means a physical computing platform which is attached to the Internet, whereas the term Web server means a software process which resides and runs on the physical Internet server to provide the Internet server with Web server functionality. The term server on its own can mean either a Web or an Internet server depending on the context, although the distinction is rarely of significance for the purposes of the following description.

The Web employs a protocol called http (HyperText Transfer Protocol) to support access by a Web browser of information on a Web server. Of course, when transmitted across the Internet, the http information is wrapped in the TCP/IP protocol. The information retrieved by the Web browser is typically an HTML (HyperText Markup Language) file which is interpreted by the browser and displayed appropriately on a display screen as a Web page of information.

The Web browser specifies the information it wishes to retrieve using a URL (Universal Resource Locator) of the form:

http://Internet server name/server directory/file name, where "http" indicates that the URL points to a Web page of information. The Internet server name is translated into a physical network location by the Internet. The server directory is the location on the server of the file and the file name is that of the file in the directory which contains or generates the required information.

FIG. 2 is a diagram which illustrates the general form of a typical graphical user interface display provided by a Web browser, for example the Netscape (TM) Navigator Web browser. The display includes several main areas: an options area 200 providing the user-options for controlling and configuring the browser, a Web page display area 210 for displaying a Web page, a location box 220 for displaying the location, or URL, of the displayed Web page, and a status box 230 which displays information concerning the status of Web page retrieval. Also illustrated on the screen is a pointer 240, the position of which can be controlled by a user using a computer mouse, roller-ball or equivalent pointing device. The user interacts with the browser by positioning the pointer appropriately on the screen and selecting available options or functions provided by the browser or displayed on the Web page by, for example, 'clicking' a mouse button.

An HTML file comprises ASCII text which includes embedded HTML tags. In general, the HTML tags are used to identify the nature and the structure of the Web page, and to identify HyperText links (hyperlinks), which are described in more detail below, and their associated URLs.

The display capabilities of a Web browser determine the appearance of the HTML file on the screen in dependence upon the HTML tags. HTML can in general identify:

the title of the file;

the hierarchical structure of the file with header levels and section names;

bulleted, numbered, and nested lists;

insertion points for graphics;

special emphasis for keywords or phrases;

pre-formatted areas of the file; and hyperlinks and associated URLs.

In general, a hyperlink provides a pointer to another file or Internet resource. Sometimes also a hyperlink can point to a different location in a currently-displayed Web page. Within an HTML file, hyperlinks are identified by their syntax, for example:

<A HREF="{URL}">{anchor-text}</A> where the < . . . > structure identifies the HTML tags.

The syntax typically includes a URL, which points to the other file, resource or location, and an anchor definition. In this case, the anchor is defined as a piece of text. In a Web page, typically a hyperlink is represented graphically on screen by the anchor. The anchor can be a piece of highlighted text or an image, for example a push-button or icon image. Where, for example, the anchor is non-textual, the underlying syntax usually also specifies a respective anchor image file location, which may be on the same or on a different server, as follows:

<A HREF="{URL}"><IMG SRC="{URL}"></A> where IMG SRC specifies the location of the image file for the anchor.

The effect of a user selecting a hyperlink, by moving a pointer over the anchor and clicking, say, the mouse button, is normally that the Web browser attempts to retrieve for display as a new Web page the file indicated by the URL. However, sometimes a URL refers to a software process rather than to a Web page per se, as described in more detail below.

In some browsers, for example Netscape (TM) Navigator, when the pointer merely moves over a hyperlink anchor, the browser can be arranged to display the underlying URL in the status box of the display screen, irrespective of whether the user selects the hyperlink or not. Thus, a user can normally see the URL of any hyperlink in a Web page.

HTML files sometimes also include references to other files, for example, graphics files, which are retrieved by the browser and displayed as part of the Web page typically to enhance visual impact. Each reference comprises an appropriate HTML tag and a URL. In practice, the browser retrieves the requested Web page first and then retrieves other files referenced in this way by the Web page. Often, therefore, the textual portions of a Web page appear before the graphical portions.

A user is able to view the ASCII text source code of an HTML file using source code viewing facilities provided by some browsers. Thus, a user is able to view the URLs for any hyperlink or other imported file.

Generally, a user can retrieve a Web page using several methods which are supported by most browsers: by manually entering the URL into the location box, by selecting a Bookmark (the stored URL of a previously-accessed Web page), or by selecting a hyperlink in a displayed Web page. The first two methods potentially allow a user to access any Web page or other resource file at any time. The third method requires the user to first access a Web page which incorporates a hyperlink to the required Web page or image file before that Web page or image file can be retrieved.

In certain circumstances, it would be desirable to limit access by the third method only.

Since, however, a user can normally see any URL embedded in an HTML file and can access a Web page by entering the respective URL directly into a browser, under normal circumstances a service provider has little control over which Web pages are accessed and how they are accessed.

Many servers are arranged to address this problem by employing access tables which include table entries controlling which users can access which pages. An alternative measure, which is widely used, is to employ user identification and password protection to protect certain files on the server. Both measures are open to some degree to "spoofing" by unauthorised persons who have been known to masquerade as an authorised user by, for example, intercepting and cracking passwords for these protected files. A further disadvantage of both measures is the management overhead of keeping access tables or password files up-to-date, particularly where large numbers of users and/or pages are involved, or where the authorised user population changes regularly.

Also, even if Web page access is controlled using access tables or password protection, a service provider normally has no control over the order in which an authorised user can access the Web pages once the URLs are known.

SUMMARY OF THE INVENTION

In accordance with one aspect, the present invention provides an information server comprising:

means for receiving a request from a client for an item of information, said item of information including at least one reference to a further item of information;

means for modifying the item of information by replacing the or at least one reference by a token;

means for storing the or each token and each respective reference in storage means; and means for returning to the client the modified item of information.

An advantage of this aspect of the invention is that the client is not provided with the actual reference information, such as a URL, for the further item(s) of information. Thus, the client would not know the name or location on the information server of the further item(s) of information.

A token preferably comprises a series of digits or other characters. Preferably, a token has a form from which no information about the reference or the respective information item can be derived. In the case of digits, the token may be, for example, generated by a random number generator each time an information item is requested. For a suitably long token number length, therefore, the chances of obtaining the same token more than once for a particular reference are relatively low.

In the following description, it is assumed that any requested item of information includes at least one reference to a further item of information.

In accordance with a second aspect, the present invention provides an information server comprising:

means for receiving a request from a client for an item of information, the request including a token indicative of the item of information required;

means for comparing the token with one or more stored tokens to find a matching stored token, each stored token being associated with a corresponding reference to an item of information; and means for returning to the client, in dependence upon finding a matching stored token, a respective corresponding item of information.

Thus, the information server only returns items of information that can be requested validly by a client, on the basis of a previously-requested item of information. An advantage of this aspect is that the information server can control the order in which items of information can be requested and returned.

In preferred embodiments, where there are a plurality of tokens and respective references stored in association with the information server, and a request includes a valid token, the information server includes means to remove from the store the remaining tokens and respective references. Thus, once one from a selection of available tokens is requested, the remaining, unrequested tokens are removed and thereafter are thus not available for request.

The information server preferably includes means to store with each token and its respective reference the identity of a valid client. Also, in embodiments where multiple clients have access to the information server, the information server includes means to derive from a request for an item of information the identity of the client. Accordingly, a request for an item of information from a particular client is processed by the information server with respect only to tokens and their respective references having a valid identity.

In a particularly advantageous form, the information server has Web server functionality. Then, a reference may comprise or incorporate a URL. The URL may be part of a hyperlink or, alternatively, it may refer to a further resource, for example an image file intended for display as part of a Web page.

An embodiment of the present invention will now be described, by way of example only, with reference to the accompanying drawings of which:

DETAILED DESCRIPTION

Figure 1:
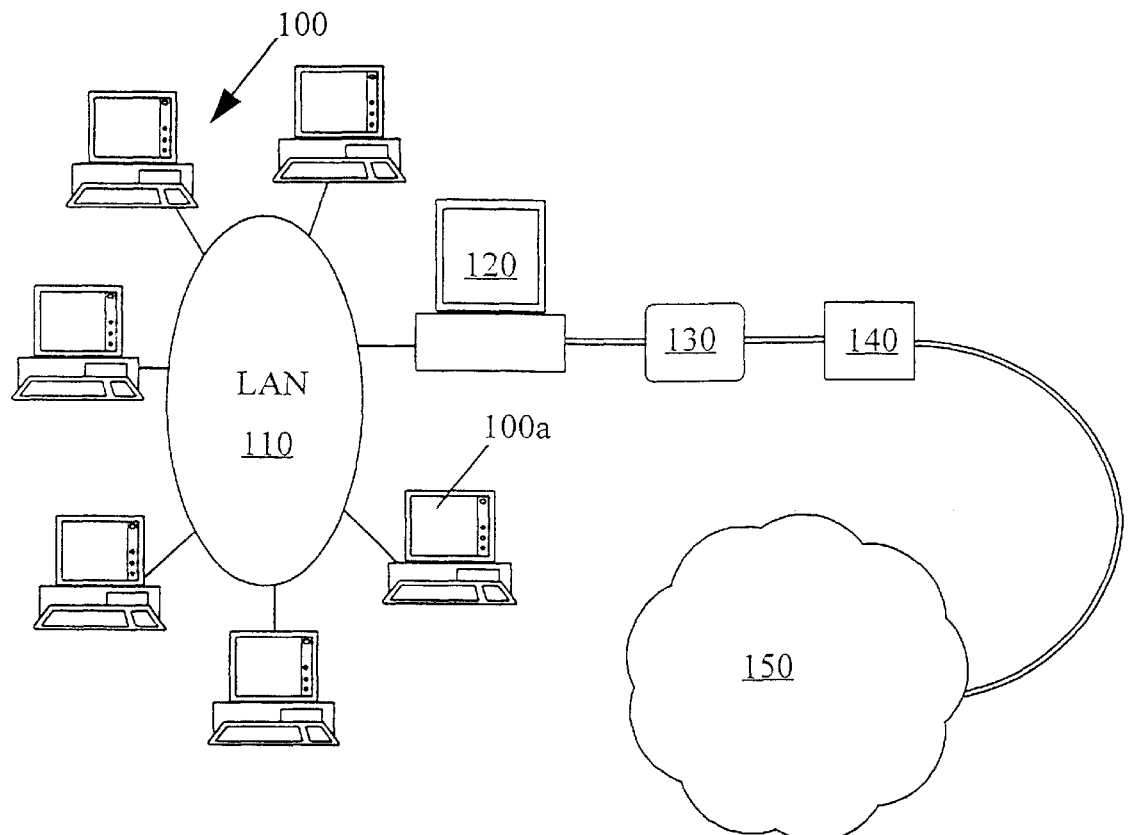
FIG. 1 is a diagram which illustrates a basic Internet connection arrangement.
Figure 2:
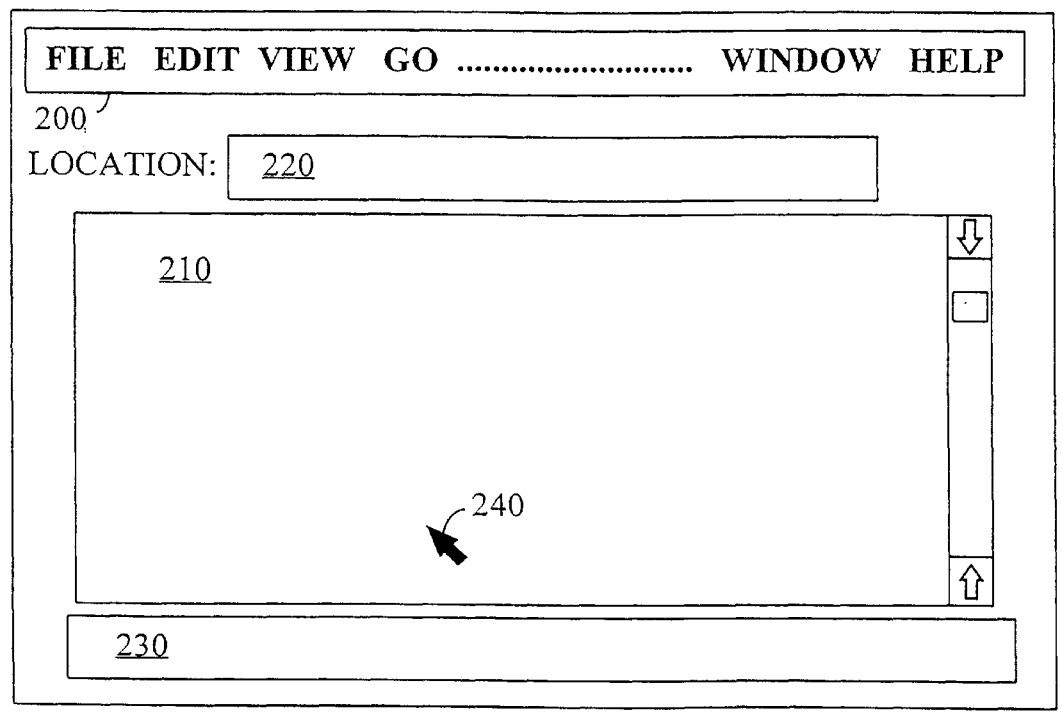
FIG. 2 is a diagram which illustrates the general form of a Web browser.

The embodiment described below is a system for providing customer access to a service provider's major customer service system (MCSS) via the Web. In the present case the service provider is a telephone company such as BT. By accessing and modifying the data held on a database, which in this case is an Oracle (TM) database, of the MCSS, customers of the service provider (especially large corporate clients having extensive and complex communications needs) can order new communications services and manage or configure those services which are already on-line for the client.

Such a system to a high degree removes human error which may arise if customers make demands by telephone or by filling in forms. In particular, in the case of corporate customers, the system gives the customer a feeling of being in control directly of their service management requirements.

In the past, access to such a system has required dedicated customer or client software running on a workstation located at a customer site, and dedicated dial-up links from the workstation to the system. A major problem associated with such an arrangement is the need to provide, update and maintain client access software.

The present system provides a tailored interface to the service provider's database using a conventional Web browser and Internet connection. The Web server is modified to handle the specific database access requirements, as described in detail below. The system also obviates any need to transfer information from the existing database onto the Web server. In particular, customer login password records, used to control customer access to the database, can therefore remain in the database which is, advantageously, physically separate from the Internet server. Such an arrangement both improves security and helps reduce server file storage capacity requirements.

The system introduces a 'session' framework within which the service provider can control or limit customer access to database facilities. The framework supports customer login and client recognition and authentication. Such a framework is typically included as part of a conventional database access system but is not a conventional aspect of the Web: the Web provides a stateless environment with no maintained connection between the client and server in which there is no framework for controlling data access, apart from possibly password protection for specific files. In particular, the framework enables control over which pages are accessible by which customers, and the order in which a customer can access Web pages. Many of the MCSS transactions require a high volume of information input which it is not possible to fit onto a single Web page. Thus, a number of Web pages are required. These pages form a specific dialogue for specific order types. The information within a dialogue must be collected and sorted so that ultimately a complete order can be placed on the MCSS while dialogues are in use. Thus, a mechanism is required for storing order data from previous Web pages while subsequent Web pages are being interacted with. Also, stored data may affect which data is included in subsequent Web pages. Indeed, the system must generate Web pages dynamically. These Web pages include: customer specific information (either previously entered or already stored on the MCSS), information relating to previous choices made within a specific dialogue, and default information resulting from previous choices. For example, a communications service ordering transaction may require a customer to enter information into four consecutive data entry screens, or Web pages. Therefore, in this example, controlling which pages can be accessed, and in which order they can be accessed, is important.

Figure 3:
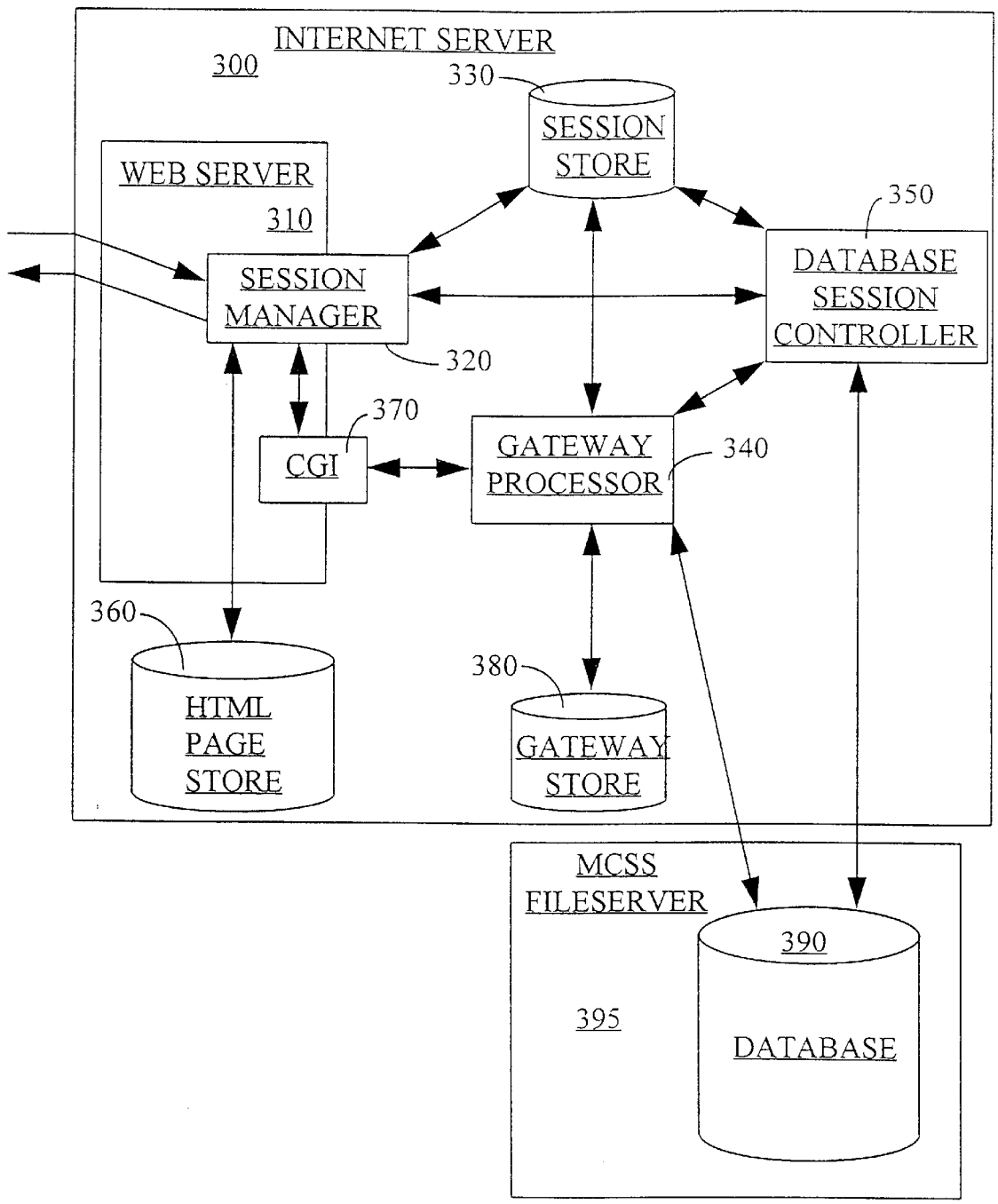
FIG. 3 is a diagram which shows the main components of a Web server modified to operate in accordance with embodiments of the present invention.

FIG. 3 is a functional block diagram which illustrates in more detail aspects of an Internet server and the related components of the present system. The Internet server 300 incorporates a Web server 310 for receiving client requests and for transmitting server responses to the requests. The Internet server 300 is a UNIX-based computing platform such as a Sun (TM) SPARCstation 20/51, and the Web server is a Netscape (TM) Enterprise Server modified to operate in accordance with the present system. The Netscape Enterprise Server provides a suitable API (application programming interface) to support such modifications. Of course, other suitable hardware and/or Web server software could be employed instead.

In accordance with the present system, the Web server 310 incorporates a session manager 320. The session manager 320 provides the extra functions necessary for supporting database session management.

The session manager 320 is implemented primarily via use of the Netscape Web Server API (NSAPI) which allows dynamic linking of server functionality from user defined library functions. Thus, the session manager 320 is in effect "built in" to the Web server 310. The session manager 320 intercepts client requests as they traverse the Web server stack and can re-define any of the information contained within the client requests and carry out actions outside of the Web server. The primary tasks enacted by the session manager are:

manage the number of concurrent user sessions to a pre-defined maximum;

allocate free user sessions to new users who are attempting to login;

associate user sessions with database sessions;

re-start database sessions which exist or die;

de-allocate database sessions when a user session times out;

tokenise URLs;

resolve requested tokenised URLs; and control time-out of user sessions.

A user session, as opposed to a database session, is allocated to a customer as soon as he or she attempts to log into the system from a login Web page. The user session is generated on a per-user basis by picking the next highest (starting at 0) unused session index for that user. The database session is allocated to the customer on gaining MCSS access. The maximum number of user sessions is limited by the number of concurrent processes which the Internet server can manage without performance degrading to below an unacceptable level. Likewise, the maximum number of database sessions is limited to the number of full-time Oracle connections that the MCSS database can support.

A database session is a process which runs on the Internet server and delivers the functionality required to access the MCSS database 390, as described in more detail below.

The session manager 320 has access to a session store 330, a gateway processor 340, a database session controller 350 and an HTML page store 360.

The gateway processor 340 is a task running on a computing platform for processing so-called gateways. Gateways can provide extension mechanisms to the Web server 310 by taking information typically from a source which is not compatible with HTML and converting it into a standard HTML file. In practice, a gateway is a script or program invoked by the Web server 310 via a common gateway interface (CGI) 370 that can accept user input through the Web server 310 and can return HTML, a URL, or some other data back to the client through the Web server 310, or can control further tasks, such as email, which typically provides no return information. Simple gateways may be written in UNIX C-shell and more complex gateways are typically written in a programming language such as C, C++ or Java. In practice, a gateway processor such as the gateway processor 340 and a Web erver such as the Web server 310 typically reside on a common computing platform. Further information on gateways and the CGI can be found in "Managing Internet Information Services" by Cricket Liu et al, published by O'Reilly & Associates, Inc. ISBN 1-56592-062-7.

The gateway processor 340 has access to a gateway store 380, which holds the gateways necessary for supporting the present system. In the present system the gateway processes are written in C. The gateway processor 340 also has direct access to the MCSS database 390, the database session controller 350 and the session store 330. The database session controller 350 has access to the session store 330 and to the database 390.

The gateway store 380 includes page building gateways for building HTML Web pages based on information retrieved, via the database session controller 350, from the database 390. Many of the page building gateways produce HTML Web pages which include form fields. The form fields are the mechanism by which customer information can be entered and passed from the customer browser to the Web server 310. Customer information retrieved in this way is processed and passed to the database 390 in an appropriate format by respective data processing gateways.

The gateway store 380 also includes login gateways for controlling who is allowed access to the information in the database 390. The login gateways allow the gateway processor 340 to access the database 390 directly, bypassing the database session controller 350, but only for the purposes of customer authorisation.

The database session controller 350 is a task running on the Internet server which controls all access to the database 390. The MCSS database 390 is held on a fileserver 395 and comprises customer information stored in database tables on an external storage device such as a hard disk drive (not shown). The hard disk drive is connected to the fileserver 395. Conventionally, customer authorisation is required each time the database 390 is accessed to open an Oracle connection. Such authorisation (for example, providing a user name and password in response to a prompt from the database 390) can take a considerable amount of time (for example, upwards of thirty seconds) especially for access to a remote database 390. In accordance with the system, therefore, the database session controller 350 opens and maintains an Oracle connection with the database 390 for each valid database session, for the duration of the session. Thus, only one initial authorisation step is required to establish the connection and session which has the effect of speeding-up consecutive database 390 accesses via the database session controller 350. When the customer ends a session, the session is closed. The session manager 320 implements a time-out strategy which limits the amount of time for which an opened session can remain inactive. Beyond this time the session is closed irrespective of whether the customer is using the session or not.

The database 390 contains: customer information such as names, addresses and customer account numbers, customer service information such as the telephone lines allocated to the customer and which services are available from each line, login information, such as encrypted password files, for each customer, and information defining which functions are available to each customer when using the system.

The session store 330 is used for holding session information for a customer during a session. The session information includes information which is stored during a dialogue, for example information provided during a series of data input Web pages. The session information also includes information which controls the Web page flow for multiple Web page transactions. For ease of understanding in the following description, the type of session information created and stored in the session store 330 for Web page flow will now be described with reference to the tables shown below.

TABLE 1

| Current User |
| --- |
| user name |
| session index |
| last access time |

TABLE 2

| Available Page |
| --- |
| user name |
| session index |
| IP address |
| real URL |
| token |
| referring URL |

TABLE 3

| Exemptions |
| --- |
| URL1 |
| URL2 |
| ... |
| URLn |

A Current User entry, illustrated as Table 1, is created by the session manager 320 and stored in the session store 330 for each customer, or user, when he first gains authorised access to the system. The 'user name' is the name entered by the user during the login procedure, which is described below. The 'session index' is a reference to the user session which is allocated to the user when access to the system is obtained. In practice, the session index is simply a number generated by a counter which increments on a per-user basis. The 'last access time' is the last time the user accessed the database 390 in the allocated session. If the time between accesses exceeds a pre-determined time-out period, for example 15 minutes, the session is closed.

An Available Page entry, as illustrated by Table 2, is created by the session manager 320 and stored in the session store 330 for each option available to a user from a Web page which is, at the time, displayed by the user's browser. Each Available Page entry corresponds to a URL embedded in the Web page. The 'user name' corresponds to the 'user name' in a Current User entry. The 'session index' corresponds to the 'session index' in a Current User entry. The 'IP address' is the address of the Internet connection of a user's browser (that is to say, the client address). This address is passed in an http header of each message or request sent from the browser to the Web server 310. The 'real URL' is the URL of the Web page referenced by the respective option. The 'token' is a random number which is generated to replace the URL. The token replaces the server directory and the file name portions of the URL which is passed, in the HTML file, back to the browser. The referring URL is the URL of the currently-displayed Web page.

A single Exemptions entry, illustrated as Table 3, is maintained in the session store 330. The exemptions are those URLs which a browser can request and which do not need to be returned by the Web server 310 in tokenised form. That is to say, the actual server directory and file name of the requested Web page are specified in the URL and can be viewed on the browser if desired. In the present embodiment, the only exempted URL which is stored as an exemption is for the login Web page, which is freely returned to any requesting browser.

Figure 4:
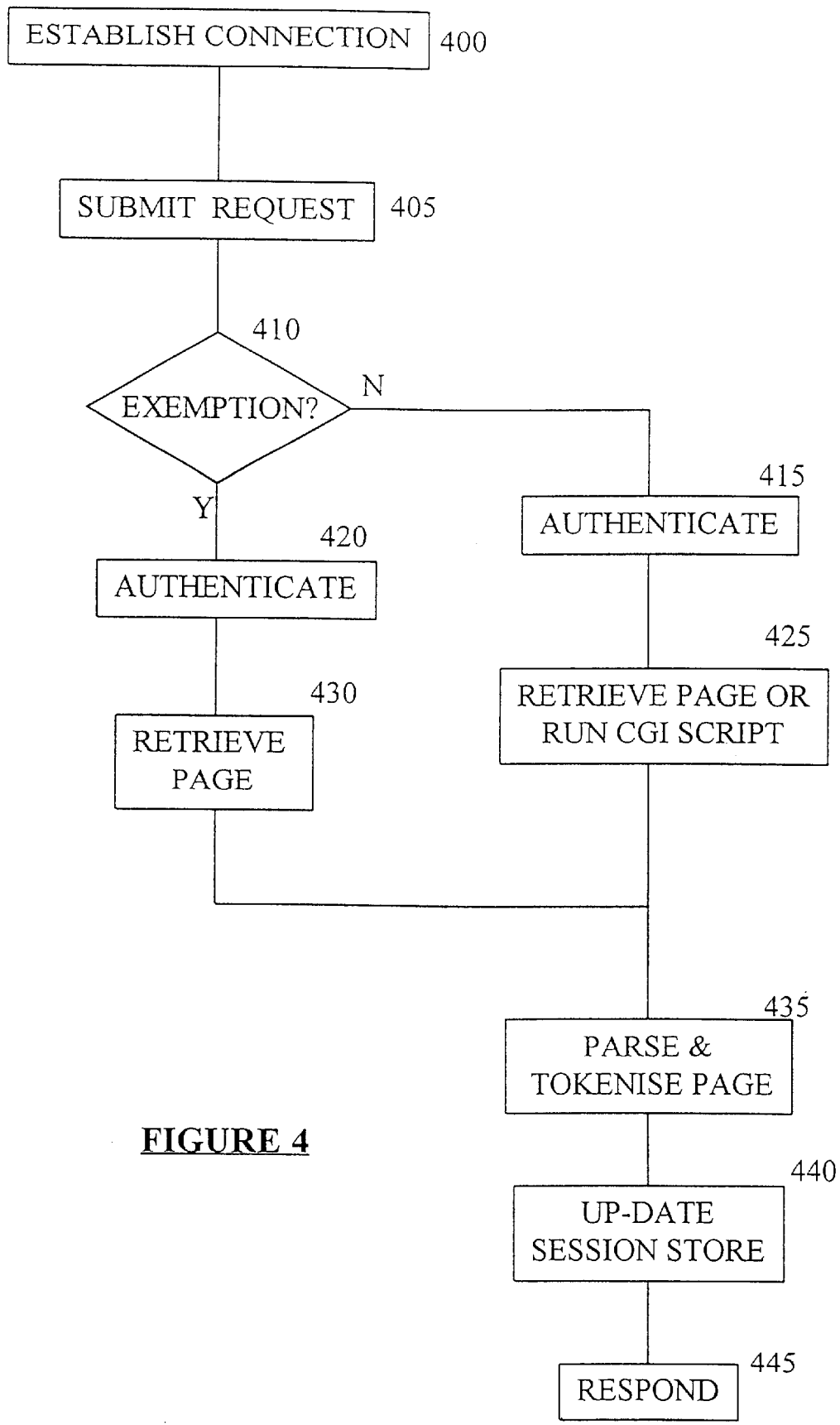
FIG. 4 is a flow diagram which illustrates the high level process flow of a system according to an embodiment of the present invention.

FIG. 4 is a diagram which illustrates the high-level process flow of the present system. As indicated by the flow diagram, there are two possible routes: one route for returning an exempted page, and one route for returning all other pages.

In the following description, unless otherwise stated, all messages from the browser will be treated as a request for a Web page, the particular Web page being specified by a URL. A request may include parameters provided by the user which are passed to the Web server 310 with the URL. The parameters typically affect how the requested Web page is formatted or generated, or which Web page is returned in response to the request.

According to FIG. 4, in step 400 the browser establishes a connection with the server. Then, the browser sends a request for a page by forwarding to the server the URL for the page in step 405. The URL is intercepted by the session manager 320.

In the case of the request being for the login page (which has an exempted URL), in step 410 the session manager 320 receives the URL, searches the exemptions list and establishes that the login URL is exempted from tokenising. In step 420 the session manager 320 authenticates the request if necessary. For the purposes of login no authentication is required since the login page will be returned to any client. In the present example, the login page is the only exempted page. However, the authentication step is shown to illustrate examples where some form of authentication is required for exempted pages other than the login page.

In step 430, the session manager 320 retrieves from the HTML page store 360 the HTML file for the login page. The HTML file, when displayed on a browser, produces a Web page which includes a submit button and input boxes for the user to enter a name and a password. The submit button is an anchor for a hyperlink having an underlying URL which points to a login gateway stored in the gateway store 380.

In the case of the request being for a non-exempted page, that is to say a page other than the login page, in step 410 the session manager 320 receives the URL, searches the exemptions list and establishes that the URL is not exempt from tokenising. Then, in step 415, the request is authenticated, as described in more detail below. Once authenticated, in step 425, either the HTML file for the requested page is retrieved from the HTML page store 360, or a gateway corresponding to the requested URL is retrieved from the gateway store 380 and processed by the gateway processor 340 to produce an HTML file for the requested page. This step will be described in more detail below for the case where the URL refers to the login gateway, which is selected by pressing the submit button on the login page.

Following step 425 or step 430, the session manager 320 then, in step 435, parses and tokenises the HTML file and replaces the or each URL embedded in the file with a random, ten-digit token. The parsing and tokenising step will be described in greater detail below.

In step 440, the session store 330 is up-dated with the details of the or each tokenised and respective original URL. This step, again, will be described in more detail below.

Finally, the tokenised page is returned to the requesting browser in step 445.

Figure 5:
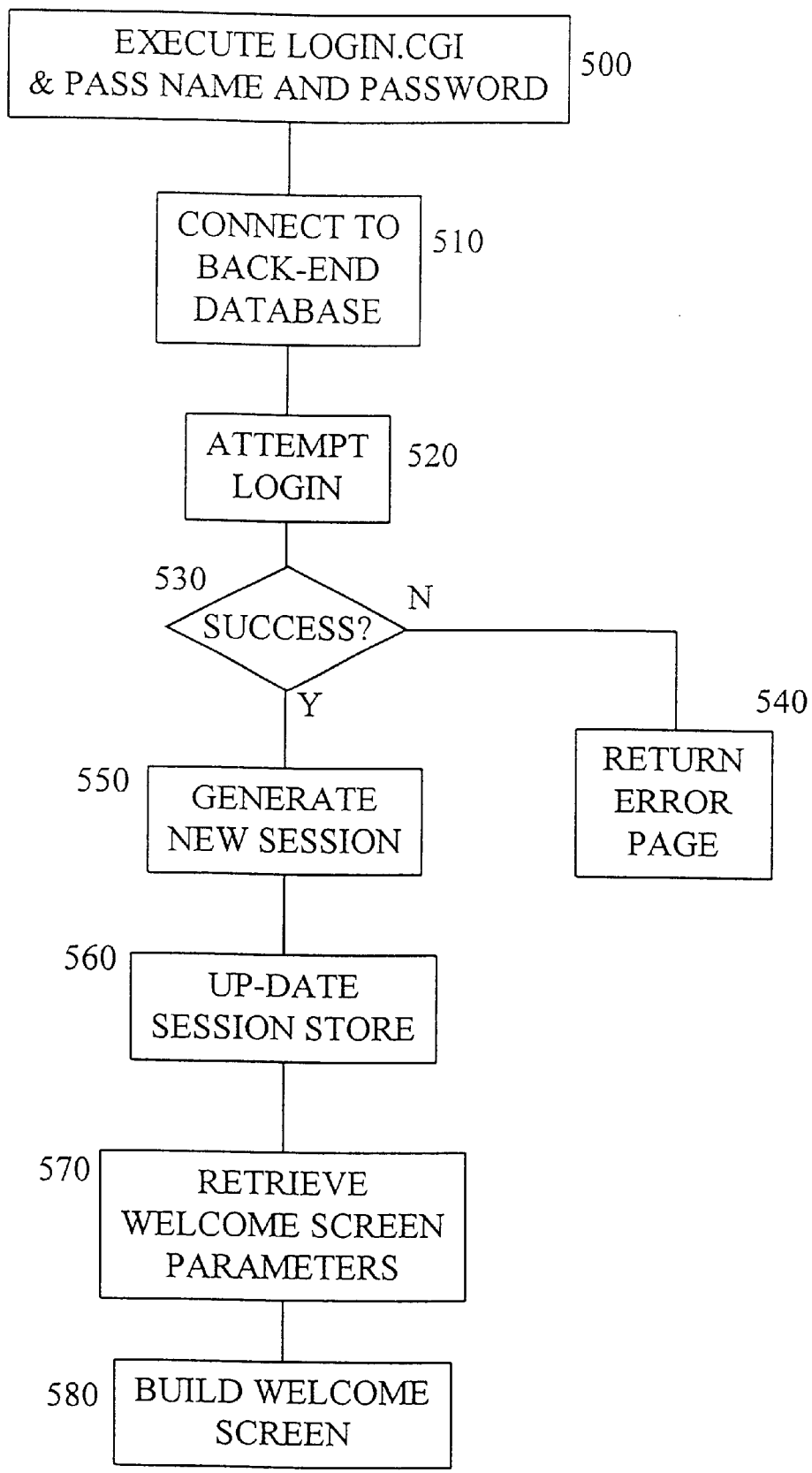
FIG. 5 is a flow diagram which illustrates the process steps for a login procedure.

The login procedure will now be described with reference to the flow diagram in FIG. 5. The login procedure, in relation to FIG. 4, occurs in step 425. Accordingly, it is assumed that the user has previously requested the login page, as described above, has provided a name, a password and has clicked on the submit button of the login page to initiate the login procedure. The URL associated with the submit button refers to a gateway stored in the gateway store 380 called "login.cgi". The name and password are passed as parameters with the request for login.cgi using the http POST method. All requests are encrypted automatically by the browser to minimise the possibility of a transmitted URL or password being intercepted and used to access the database 390 by another, fraudulent party. Obviously, the server is provided with the appropriate decryption functionality. The converse is also true—all server responses are encrypted in such a way that the browser is able to de-crypt these. Both encryption and decryption are provided by the SSL (Secure Sockets Layer) protocol.

In step 500, in response to receipt of the request for the login.cgi, the session manager 320 generates a user session by allocating the next session index to the user. Then, the session manager 320 signals the gateway processor 340 to execute the login gateway. In doing so, the session manager 320 also passes the name and password to the gateway processor 340. In step 510, the gateway processor 340, under the control of the login gateway, forms a connection with the database 390. Then, the gateway processor 340 passes the user name and password in an appropriate form to the database 390 in step 520 to attempt a login to the database 390. Unsuccessful login, in step 530, is signalled to the gateway processor 340 by the database 390. In response, the gateway processor 340 generates an error Web page which is returned to the session manager 320. The session manager 320 in response returns the error Web page to the browser in step 540.

Upon successful log in, signalled appropriately by the database 390, the gateway processor 340, in step 550, initiates the generation of a database session for the user. The gateway processor 340 achieves this firstly by clearing the connection with the database 390. Then, the gateway processor 340 signals to the database session controller 350 to establish a database session with the database 390 for the, now authorised, user using the same user name and password. The database session controller 350 logs back in to the database 390 and creates a database session. Having created the session, in step 560, the database session controller 350 accesses and up-dates the session store 330 by creating a current user entry which includes the user's name, an allocated session index and the access time (which when accessed subsequently is treated as the last access time)

Having established a database session, in step 570, the gateway processor 340, controlled by the login gateway, generates a 'directive' for the user's browser to cause a warning screen to be displayed. This screen allows a user to abort the login, or continue. If the user chooses to continue, in a step 570, the gateway processor 340 retrieves and executes a process (called homepage.cgi) which obtains customer information provided by the session manager 320, and the database (via the database session controller 350) to generate a specific welcome page for the user. The parameters determine which options are available to the user from the welcome page which is to be generated. Each option forms a hyperlink to a further respective gateway or Web page. The welcome page, in step 580, is then generated on the basis of the parameters. The next step corresponds to step 435 of FIG. 4.

The parsing and tokenising step (step 435 of FIG. 4) will now be described with reference to FIG. 6.

Figure 6:
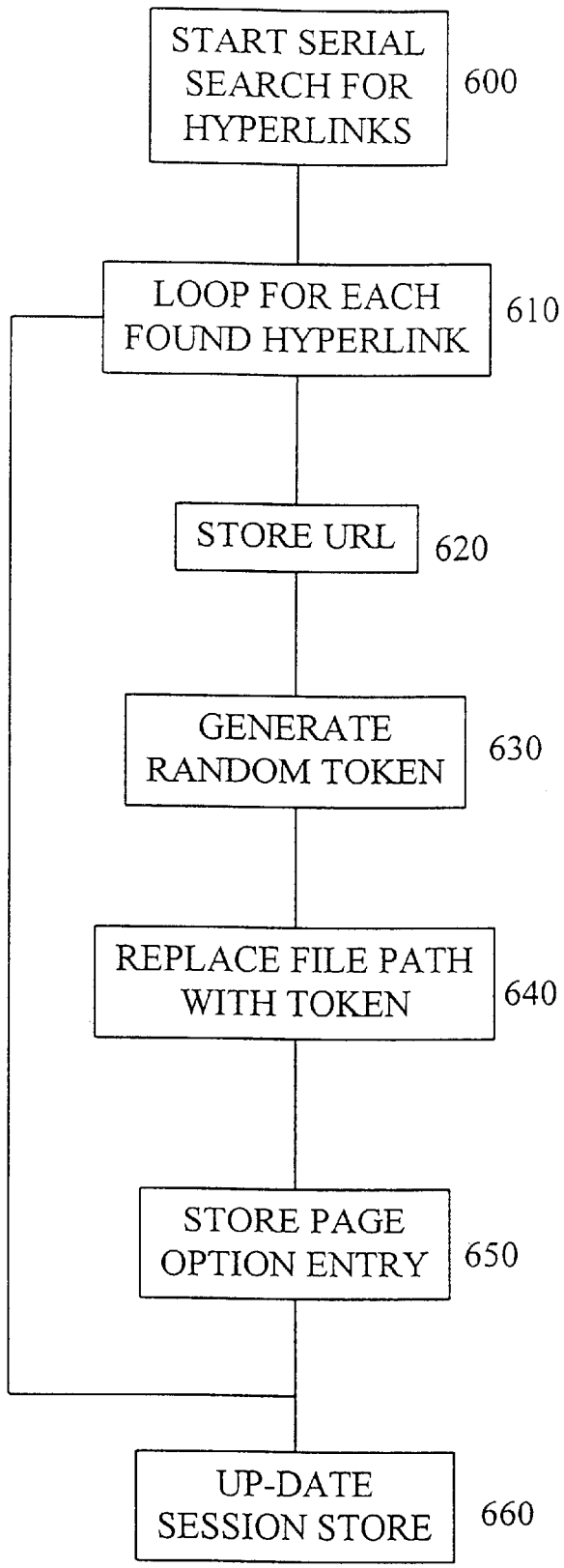
FIG. 6 is a flow diagram which illustrates the process steps for a parsing and tokenising procedure.

According to FIG. 6, the session controller, on receipt of the required HTML file, in step 600, parses (or searches serially from the beginning of) the file to find URLs, or other types of reference to further resources, embedded in the ASCII text of the file. Typically, the URLs which are present refer to Web pages providing further options to the user, or to image files for Web page buttons or images to be incorporated in the Web page to, for example, enhance the visual impact of the Web page. Hereafter, only hyperlink URLs providing further options and image file URLs will be discussed, for reasons of clarity only.

In step 610, a processing loop is established to enact tokenising each time a URL is discovered. In step 620, when a URL is found it is stored in memory. Then, in step 630, a token in the form of a random number is generated using a system call, available on Unix computing platforms, to a function called "elf_hash()". This function is a pseudo-random number generator which takes a null-terminated string and returns a UNIX long integer based on the string. The string used in the elf_hash() call in the present case is a concatenation of:

a random number; the user's login name; the user's session index; the requested URL; and the current time.

Such a string will inevitably provide a high probability that the returned integer is unique. However, the returned integer is compared with all other tokens in the session store 330 to check that it is unique. If it is not unique, a new token is generated using elf_hash(), with the random number part of the string concatenation being newly generated. In addition, the generation process pauses for one second to ensure that the current time is different. The elf_hash() function is such that even a small change in the string passed as the parameter can result in a completely different random number being generated. This procedure is repeated until a unique token is generated.

In step 640, the stored URL is modified by replacing the server directory and filename portions of the URL with the token. The 'tokenised' URL is then copied back to the file to replace the original URL.

In step 650, a 'Page Option' entry having the form illustrated by Table 2 above is stored in the session store 330.

This procedure is repeated for all URLs which are discovered in the file. Finally, in step 660, the tokenised URLs which are stored in memory are compared with the tokenised URLs of each Page Option entry stored in the session store 330 and having the session index for the user in question. Each Page Option entry not having a corresponding tokenised URL in memory is deemed to be old and no longer representative of a valid user option available from the requested page. Accordingly, each old entry is deleted from the session store 330. This step is equivalent to step 440 of FIG. 4 for up-dating the session store 330.

The steps for authentication according to step 415 of FIG. 4 will now be described with reference to FIG. 7.

Figure 7:
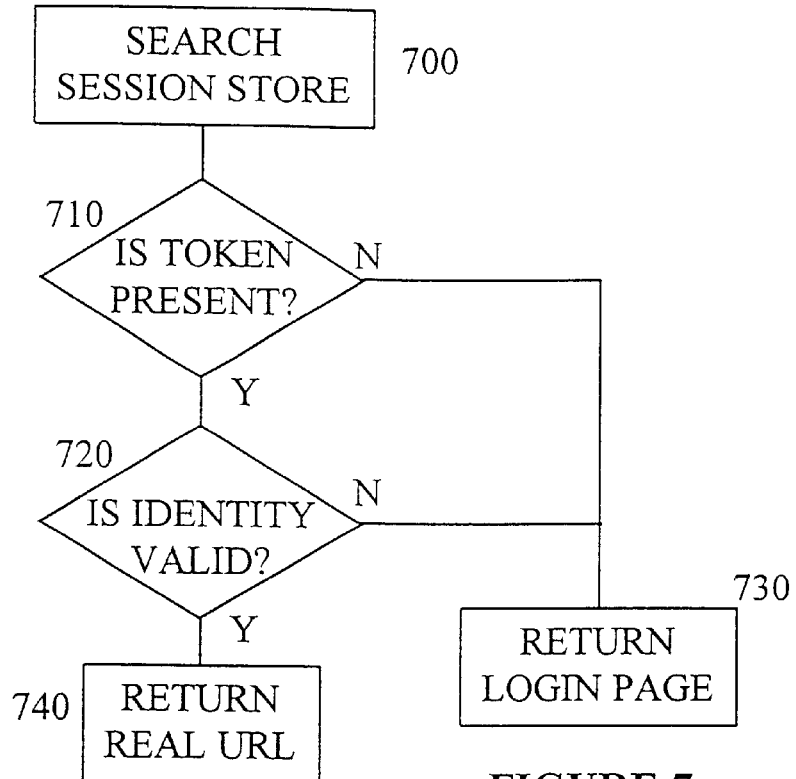
FIG. 7 is a flow diagram which illustrates the process steps for an authentication procedure.

According to FIG. 7, in step 700, the session manager 320 accesses the session store 330 to match the tokenised URL received as part of the request with a tokenised URL in a Page Option entry. If there is no matching tokenised URL, in step 710, the URL is deemed invalid and in step, 730 the session manager 320 initiates the login procedure, as described above, by retrieving the login page HTML file from the HTML page store 360 and returning the file to the requesting browser. The user will then need to login before being allowed to access the database 390. If found, in step 710, further authentication is carried out in step 720 on the basis of the accessing browser's identity. The identity is in the form of an IP address for the browser, which is transmitted by the browser in the header of the request. To be deemed authentic, the IP address must match the IP address stored in the Page Option entry for the respective token. If the IP address is the one present in the Page Option entry, then, in step 740, the real URL for the file is retrieved from the Page Option entry. The real URL points to the required HTML file in the file store, or the gateway in the gateway store 380, requested by the user. If the IP address is invalid, that is to say the IP address does not correspond to the IP address in the respective Page Option entry, then, in step 730, the login procedure is initiated.

The generation of Web pages by page building gateways will now be described with reference to FIG. 8.

Figure 8:
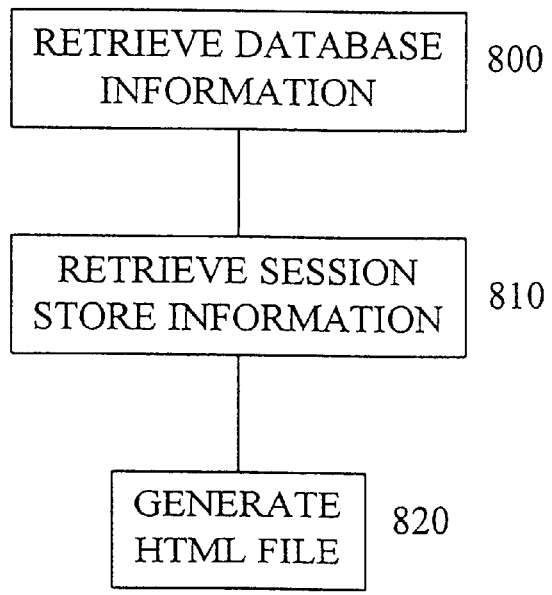
FIG. 8 is a flow diagram which illustrates the generic process steps for building HTML pages.

When, in response to a user request, the gateway processor 340 retrieves a page building gateway from the gateway store 380 (step 425 of FIG. 4), according to FIG. 8, the gateway processor 340, in step 800, retrieves from the database the information which is to be used for generating the Web page. As described above, some user dialogues, requiring multiple Web pages for information input, require the information input to be stored until the dialogue is complete and an MCSS transaction, on the basis of the information, is enacted. Therefore, in step 810, the gateway processor if necessary accesses the session store 330 to retrieve any prior-input dialogue information which is also to be included in the Web page. Then, in step 820, the HTML file for the Web page is generated, by well-known procedures, on the basis of the respective information. Subsequently, the procedure continues with step 435 of FIG. 4.

The tokens are generated afresh each time a new page is accessed, and then are removed from the session store 330 when the respective option is no longer available. Consequently, even though a user can save or remember a tokenised URL, if the user tries to use it in future, the tokenised URL will not be found in the session store 330. This results in two important implications. Firstly, a user is forced to access pages in a service in a way determined by the service provider—a user cannot select at random any page he chooses, unless the page token/URL pair is in the session store 330. Secondly, no user can access information using someone else's URL. The former implication allows a service provider to control closely how a user accesses pages of information. For example, a service may be an on-line commodity ordering service for which a user needs to provide certain information and specify certain choices for a specific commodity to be ordered satisfactorily. The ordering process may involve a number of different pages to be provided to the user in stages which may vary depending on choices made at each stage. The present embodiment would control closely how the user was able to access the required pages.

In the embodiment described above, user authorisation, by for example providing a username and password, is only required for an initial login page. Authorisation of this kind is not required for any pages accessed from, for example, a welcome page which is provided after the login page.

It is envisaged that the principles embodied in the system could also be employed for other purposes, for example to prevent "in-lining". In-lining is a practice whereby a Web user incorporates hyperlinks in his or her Web pages which point to Web resources generated by other Web users. Typically, in-lining is used to embed other people's Web-based image files into a users own Web pages, thereby utilising the other people's intellectual effort.

In general, embodiments of the inventions provide a database owner such as a service provider with a means to control who has access to information stored in the database and also a means to control how exactly the data is accessed by an authorised accessor.

The skilled person will no doubt be able to arrive at further embodiments, aspects or variants of the invention which also fall within the scope or essence of the present invention.

What is claimed is:

1. An information server comprising:
   means for establishing a session between a client and an information server;
   means for receiving at said information server a first request from the client for an item of information, said item of information including a plurality of references to a plurality of further items of information;
   means for modifying the item of information by replacing at least one reference by a token;
   means for storing data that relates each token to its corresponding reference in storage means for the duration of said session;
   means for returning to the client the modified item of information in which at least one reference has been replaced by a token;
   means for receiving at said information server a second request from the client for an item of information, the second request including a token indicative of the item of information requested;
   means for comparing the token with the tokens which have been stored in said storage means during said session to find a matching stored token; and
   means for returning to the client, in dependence upon finding a matching stored token, the respective corresponding item of information.

2. A server according to claim 1, further comprising means for deriving from a request an indication of the identity of the client.

3. A server according to claim 2, further comprising means for comparing the indication of the identity of the client with indications of identity stored in association with each stored token and corresponding reference, and wherein the means for returning operates also in dependence on finding a matching stored indication of identity with the indication of the identity of the client derived from the request.

4. A server according to claim 1, further comprising random number generating means for generating a random number and forming a token on the basis of the random number.

5. A server according to claim 1, further comprising means for storing in association with each token and its corresponding reference an indication of the identity of the client.

6. An information server having Web server functionality operable in accordance with the server according to claim 1.

7. An information server for providing information in response to requests, comprising:
   a session manager for allocating a session to a client requesting information; and
   a session store, wherein
   if the client-requested information includes references to further information, said session manager, before providing the client-requested information to the client, replaces at least some of the references with tokens and stores data in said session store that relates each token to the reference it replaced, and
   if a request from the client for information includes one of the tokens, said session manager compares the token in the request with the tokens in the session store to find a matching stored token and returns information corresponding to the matching stored token to the client.

8. An information server according to claim 7, further comprising:
   a database; and
   page building gateways for building HTML pages on information retrieved from said database, wherein
   the client-requested information is an HTML page built by said page building gateways and the references to further information include uniform resource locators (URLs).

9. An information server according to claim 8, further comprising:
   log-in gateways for controlling whether the client is allowed access to said database.

10. An information server according to claim 7, wherein the client-requested information is an HTML page and the references to further information include uniform resource locators (URLs).

11. An information server according to claim 7, further comprising: an HTML page store, wherein the client-requested information is an HTML page stored in said HTML page store and the references to further information include uniform resource locators (URLs).

12. An information server according to claim 7, further comprising a random number generator for generating random numbers used for at least part of the tokens.

13. An information server according to claim 7, wherein said session store stores exception entries identifying certain client-requested information for which the references to further information included therein need not be replaced with tokens.

14. A method for providing information in response to requests comprising:
   allocating a session to a client requesting information from an information server;
   before providing to the client client-requested information containing references to further information, replacing at least some of the references with tokens and storing in a session store data that relates each token to the reference it replaced; and
   if a request from the client for information includes one of the tokens, comparing the token in the request with the tokens in the session store to find a matching stored token and returning information corresponding to the matching stored token to the client.

15. A method according to claim 14, wherein the client-requested information is an HTML page and the references to further information include uniform resource locators (URLs).

16. A method of controlling an information server, comprising the steps of:
   establishing a session between a client and the information server;
   receiving a first request from the client for an item of information, said item of information including a plurality of references to a plurality of further items of information;
   modifying the item of information by replacing at least one reference by a token;
   storing data that relates each token to its corresponding reference in a store for the duration of said session; and
   returning to the client the modified item of information in which at least one reference has been replaced by a token;
   receiving a second request from the client for an item of information, the second request including a token indicative of the item of information requested;
   comparing the token with the tokens which have been stored in said store during said session to find a matching stored token; and
   returning to the client, in dependence upon finding a matching stored token, the respective corresponding item of information.

17. A method of controlling an information server according to claim 16, in which the server has Web functionality and at least one request from the client is a request for an HTML-formatted document, said method comprising the additional steps of:
   retrieving from a data source data to be formatted as the requested HTML-formatted document; and forming the requested HTML-formatted document on the basis of the retrieved data.

18. A method of controlling an information server according to claim 16, in which the server has Web functionality and at least one request from the client is a request for an HTML-formatted document, said method comprising the additional step of:
   retrieving from a data source the requested HTML-formatted document.

* * * * *